April 9, 1940.					G. S. LANE					2,196,396
BRAKE ADJUSTMENT
Filed Aug. 11, 1936			3 Sheets-Sheet 1

INVENTOR
GEORGE S. LANE
BY
ATTORNEYS

April 9, 1940.　　　G. S. LANE　　　2,196,396

BRAKE ADJUSTMENT

Filed Aug. 11, 1936　　　3 Sheets-Sheet 2

INVENTOR
GEORGE S. LANE
BY
ATTORNEYS

April 9, 1940.  G. S. LANE  2,196,396
BRAKE ADJUSTMENT
Filed Aug. 11, 1936   3 Sheets-Sheet 3

INVENTOR
GEORGE S. LANE
BY
ATTORNEYS

Patented Apr. 9, 1940

2,196,396

UNITED STATES PATENT OFFICE 2,196,396

BRAKE ADJUSTMENT

George S. Lane, Schenevus, N. Y.

Application August 11, 1936, Serial No. 95,312

7 Claims. (Cl. 188—79.5)

This invention relates to brakes and more particularly to self-adjusting vehicle braking systems.

Under the conditions created by congested traffic and modern high speed automobiles designed to be driven over long periods of time without attention or adjustment attention has of late years been strongly focused on the need for improvement in braking systems. It is generally recognized that one of the greatest causes of serious accidents is the failure of brakes because of a lack of proper adjustment. Because the wear occurs very gradually the decrease in brake effectiveness is not at once noticeable to the driver of an automobile and as a consequence the brakes often are not adjusted until they have become seriously ineffective and a substantial accident hazard.

This condition is greatly exaggerated by the fact that, upon stopping from very high speed or upon a long incline or where several stops are required in rapid succession, heating of the drum will occur with consequent expansion; and as a result of this expansion brakes which when cold were in proper adjustment may become partially or wholly ineffective. Thus the need for adjustment may not become apparent at all until an emergency arises. These conditions can only be corrected by an automatic adjusting device. Accordingly, it is an object of my invention to provide a device adapted automatically to maintain braking systems in proper adjustment throughout the entire life of the mechanism and without the necessity of attention or intervention by the driver or any other human agency.

Another object of my invention is to provide a device so simple in its operation and so rugged in its construction that it will be entirely fool proof and free from any danger of failing to properly operate.

Another object of my invention is to provide a simplified construction which will reduce the cost of braking systems at the same time that their efficiency and safety is increased.

I have now discovered that superior results may be obtained more economically and more easily than by any ratchet device such as has been suggested for automatic adjustment, if a ductile member is used which is yieldable to a force normally exerted upon the braking element during its application and during movement to its position of application. This I have accomplished by use of ductility, or plastic flow with the initial limit of permanent deformation substantially coinciding with the position at which the brakes are fully applied.

Such yieldable member may be designed either to limit the action of the retracting spring or itself to serve the function of and to replace the retracting spring by itself retracting the braking element with a limited elastic return to the necessary clearance from the drum.

In the accompanying drawings I have shown several embodiments of my invention with a view to illustrating the invention and its practical application and explaining the principle thereof, so that others skilled in the art may be enabled to apply it under varying circumstances and conditions. These drawings and the following specification are not intended to be exhaustive or limiting of the invention, but rather to enable others to design numerous different embodiments of my invention each particularly suited to the particular requirements for which it is intended.

Figure 1:
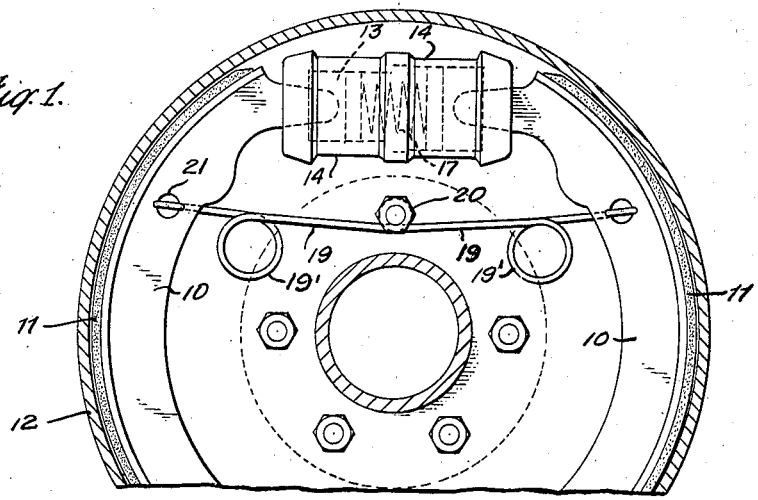
Fig. 1 is a fragmentary view, partly in vertical section and partly in side elevation, of a brake system embodying my invention.
Figure 6:
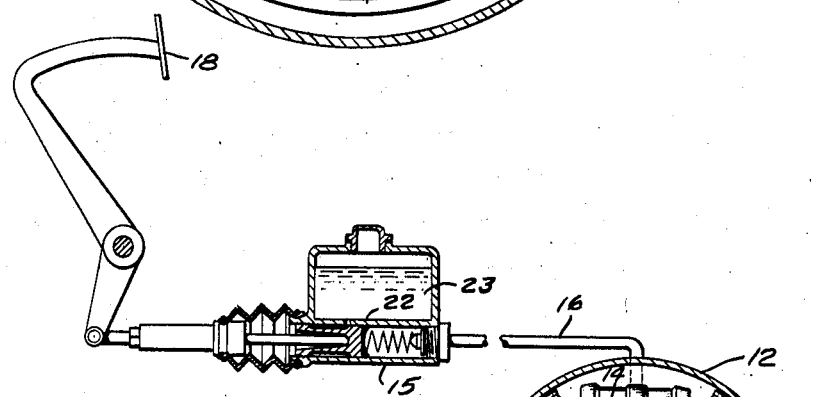
Fig. 6 is a diagrammatic view showing the entire brake system.

Referring first to Figs. 1 and 6, I have there shown a portion of a hydraulically operated braking system such as is now in common use on standard motor vehicles. The brake shoe 10 is a T section arcuate member having a facing 11 thereon of a suitable friction material which is shaped and positioned so as to have a small uniform clearance from the rotating drum 12. In normal practice this clearance varies from about 0.020" to 0.005". The shoe 10 is moved into engagement with the drum 12 by force applied to it from the piston 13 of the brake operating motor 14 and this in turn is provided with fluid under pressure, e. g., from a pedal operated master cylinder 15 and suitable piping connections 16. A spring 17 between the pistons 13 holds them against the shoes 10 when the brake system is in the released condition.

Thus far the construction is entirely according to standard practice and the brake shoe 10 is shown merely as representative of any type of brake device which may be subject to wear, and the brake operating parts 13, 14 and 16 are representative of any brake operating and retracting devices, and particularly of a brake operating device which, like the hydraulic system, is capable of readjusting itself automatically when in the released condition (e. g., by flow of liquid from the reservoir 23 through the breather opening 22) to permit the full return of the pedal 13 or other force applying means and thereby to permit each operating stroke of the pedal to become effective from its beginning upon the braking element regardless of the released position of the latter.

The novel element added to this combination according to my invention is the stop member 19 which, in the case illustrated in Fig. 1, is secured to one of the flange bolts 20 on the axle housing.

Figure 2:
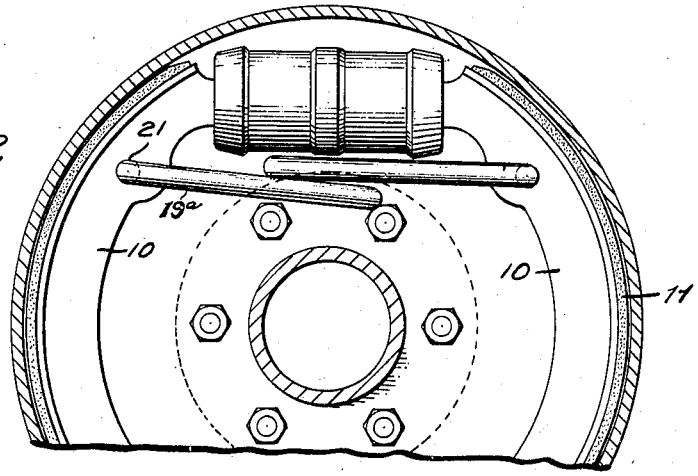
Fig. 2 is a similar view of another embodiment of my invention.

As clearly illustrated this stop member 19 is made of relatively heavy wire, strip or bar stock and is preferably of a highly ductile metal advantageously of low elastic limit so that it is readily deformed beyond its elastic limit. In order to facilitate the bending of the stop by the movement of the brake shoe 10, the stop 19 is advantageously provided with a bend, e. g., a loop as shown, or otherwise with a portion 19' transverse to the direction of movement of the shoe so that the strain imposed upon the stop 19 is a transverse bending strain rather than compression or elongation. This, however, is not essential. A stop member may be used, e. g., as shown in Fig. 2, in which the strain is simple elongation by axial stretching, e. g., of a bar, strip, special shapes such as L, T, or X, or even a tube. This has the advantage that there is no danger of the stop member being bent back when the brakes are relined and thus any danger of alteration of the metal by excessive fatigue or working or mishandling is avoided. With suitable choice of metal, however, e. g., fully annealed pure aluminum, any such danger is substantially non-existent, since it can be rebent many times without altering its spherical characteristics materially.

The end of the stop member 19 in this embodiment, as shown in Fig. 1, is bent over at right angles and passed through the hole 21 in the web of the shoe 10. As clearly shown in Fig. 1 the stop 19 fits the hole 21 snugly, but it may also have a substantial clearance in the hole 21 if a retracting spring is used. The total proper amplitude of operating movement of the brake shoe 10, including clearance between the drum 12 and the lining 11, should equal the total elastic movement of which the member 19 is capable in following the movement of the brake shoe 10 plus any clearance between the stop 19 and the shoe 10. Thus the stop member 19 should reach its elastic limit substantially at the point of full engagement of the brake shoe 10, i. e., at the end of its proper stroke, and any further movement of the brake shoe, e. g., because of wear of the lining 11, will result in permanent deformation of the stop 19. Consequently upon the release of the shoe 10 the stop 19 will stop the shoe at a more advanced position substantially corresponding to the amount of wear; and, with the shoe thus stopped, the hydraulic system will automatically readjust by feeding of liquid through the breather opening 22 from the reservoir 23, so that thereafter the pedal stroke will be effective upon the brake from this new position.

It might be expected that at times such readjustment would occur because of a temporary expansion of the drum 12 due to frictional heating. This might possibly occur in the case of a severe application of the brakes at an excessively high speed, or upon a steep grade, so that the drum is rapidly heated, and therefore expanded radially, before a corresponding temperature increase and expansion can be communicated to the stop member 19. In any proper driving, this does not in fact occur because the expansion of the member 19, even though it may lag behind that of the drum, will be sufficient to prevent objectionable over-adjustment. It is an important advantage of my invention, however, that if such a condition should occur, a temporary adjustment will be made which permits the brakes to be used effectively regardless of such excessive expansion of the drum; and, upon cooling of the drum, the brakes cannot be locked because the member 19 is adapted to be bent by a force much less than is required to produce appreciable braking; and, therefore, at most only a very light "dragging" of the brakes can result in such case. Even this drag will not continue for long: In the first place because it will create sufficient heat in the drum to expand it again away from the dragging position; and secondly, because a substantial radial force is required to keep a stationary body in contact with a rapidly rotating body. This "kick-back" force serves to drive the shoe 10 away from the drum 12 and thereby to provide the necessary clearance.

I have already referred to Fig. 2 as showing the use of stop members 19a which are adjusted by axial elongation or stretching. This member 19a can be attached to the back-plate by any of the methods commonly used by machinists. For example the member may be bent to a 90° angle and held in place by an upset head, nut, pin, etc., or, if preferred, it might be passed through the hole and then further bent back double on itself. In order to provide the necessary elongation and elastic retraction without excessive braking effort the members 19a have been made longer and each substantially parallel to the movement of its point of attachment on the braking element 10. This design and construction has the additional advantage that it provides a greater length in which thermal expansion can be effective. Thus, for example, with the members 19a made of aluminum or certain brass alloys of high coefficient of expansion the expansion of these elements upon heating of the drum may easily be made sufficient to produce a temporary advanced position of the brake shoes of the system with no permanent straining of the adjusting members 19a. Obviously, the design and choice of metal should be such as to avoid over-expansion, which would cause the brake to drag when heated. By correct design for the proper expansion, the retracted position of the braking element 10 substantially follows automatically the expansion of the drum and full effective braking will thus at all times remain within reach of the normal pedal stroke. The normal clearance in this case should be sufficient nevertheless to accommodate some unequal expansion so that when the drum begins to cool and before the members 19a have substantially cooled, there can be no tendency to drag the brake. If the members 19a are designed to provide a little less than enough expansion to fully follow the drum, this clearance will be increased and this additional safety factor added.

In order for the operations to take place as above described it is ordinarily advisable that the stop member 19 should be about as "dead" as possible, that is to say it should be ductile and have a low limit of elasticity while still being capable of withstanding the forces to which it may be subjected in normal use without seriously changing its limit of elasticity due to such heating and cooling, vibration and repeated bending as it is subjected to in use.

In the case shown in Fig. 1, the stop member 19 serves also the function of, and replaces, the usual retraction spring. This is not essential, but is an important advantage, and for this purpose the stop member 19 should have just enough elasticity to retract the brake shoe to the necessary clearance, and with the necessary initial force to quickly clear itself from contact with the drum.

The materials which I have found best suited for this purpose are aluminum, including various alloys of aluminum, but especially the substantially pure fully annealed metal or that known commercially as the 2SO grade, magnesium alloys, as for example the alloy known as Dow metal and certain of the nickel steels, for example a two and one-half percent nickel ferrous alloy. My invention, however, is not limited to materials which are wholly "dead" or nearly so, and I may use any material provided that its limit of elasticity is reached substantially at the point of full engagement of the braking element and provided that it is adapted to be bent beyond its limit of elasticity by a force which is within that readily applied by the brake pedal or other force applying means. If the elastic return of the member 19 is normally greater than the desired clearance it can be balanced by an opposed spring so that it will reach an equilibrium position at substantially the desired clearance. In either case the member 19 will be held under tension so as to avoid rattling of the parts. The word "tension" is used herein and in the accompanying claims in its broadest sense to include compression and lateral deflection.

Also, if the hole 21 is made with substantial clearance and a separate retracting spring is used a material with a lesser elastic limit should be used, whereas if there is less clearance in the hole 21 or more clearance from the drum then a greater elastic limit is permissible.

Even when the retracting spring is used the retracting effect of the member 19 is important and permits the use of a lighter retracting spring.

I have already suggested above in connection with Fig. 1 that a greater degree of elasticity can be allowed if the construction is so designed that the limit of elasticity of the stop member is reached at the point of normal full engagement. If this is kept in mind the stop 19 may be made to serve the function of the retracting spring as well.

As examples of this I may use a nickel steel wire 19, e. g., 3/32" to 3/32" diameter; and in the form shown in Fig. 1 as the yieldable stop, or I may use an aluminum wire of ¼" diameter 2SO grade in the form shown at 19f in Fig. 6 with its ends swaged flat and pierced for bolting to the hub bolt 20 at one end and to the shoe at 21 at the other end. In practice with such an arrangement this stop member may be made with its attaching ends substantially closer than the distance between the bolt 20 and the opening 21 in the shoe 10. The stop member is stretched, flexing the loop portion 24 of the stop member, until the end loop 25 can be snapped into the opening 21. Upon the first application of the brakes the member 19 will be stretched beyond its limit of elasticity and thus a new elastic limit will be established substantially at the point of complete application. The strength of the spring 19 and its total elastic deflection are chosen so that they will be balanced against the spring 17 in the fluid pressure motor 14 (see particularly Fig. 1), when approximately the desired clearance between the shoe and the drum is reached. Since this position depends upon a dynamic balance between two springs (17 and 19), the stop position is not determined with absolute accuracy and the clearance allowed between the shoe and the drum should, therefore, be slightly greater than in the case where a substantially "dead" stop is used with a separate retracting spring.

Since the spring 17 holds the stop at a position short of the center of its elastic movement, whereas, by a separate retracting spring it can be pulled beyond the center, this and especially the choice of the stiffness of such springs give a wide range of possible compensation to correct for any inherent inadequacy in elastic limit of a particular metal which otherwise would be suited for use in the stop.

In Fig. 2, I have shown an example in which a longer stop member 19a is used in order to give greater thermal expansion.

I have discussed above the case in which an over-adjustment may be made due to sudden excessive thermal expansion of the drum. In most cases, however, the expansion of the drum due to the frictional heat developed in the braking operation can be compensated for by a corresponding expansion in the stop member 19. Thus if aluminum is used as the metal for this stop and the distance between the point of attachment 20 and the end of the stop member at 21 is properly related, taking into consideration the co-efficients of thermal expansion of the drum and of the stop member and the relative temperatures attained by the two members, the expansion of the aluminum may be made sufficient to compensate for the expansion of the drum so as to keep full application of the shoes always within the range of pedal operation; and such variations as occur in any normal operation, either by sudden heating or by sudden cooling of the drum before the corresponding temperature change has effected the member 19, may be absorbed as a slight increase or decrease in the clearance between the lining and the drum without substantially affecting the proper operation of the brake.

Figure 3:
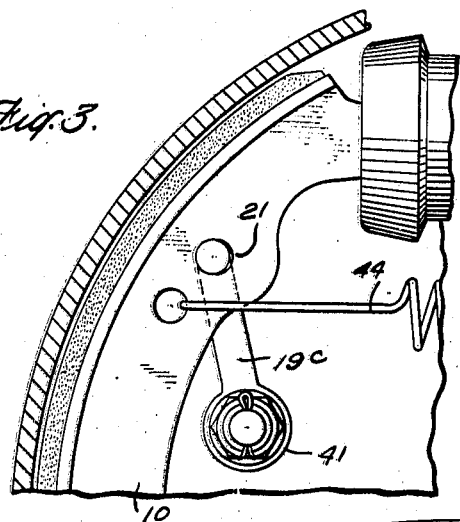
Fig. 3 is a fragmentary view similar to Figs. 1 and 2 showing another embodiment of my invention.

In Fig. 3, I have shown an embodiment of my invention in which the yielding is transverse to the action of the substantially straight stop member 19c. In such a case the yielding is by bending of the stop member 19c. Since the arm 19c is substantially transverse to the radius of the drum, its thermal expansion does not materially affect the brake adjustment, and thus this construction may be used where temporary thermal adjustment is not desired.

The member 19c is rigidly secured and adjustment is by bending of its metal, as already fully described in connection with the other figures. Athough a separate retracting spring 44 is shown in this figure, this is optional in all cases and is not especially tied up with the particular stop shown.

It is an advantage of this system of automatic adjustment that, as the lining wears, the clearance is reduced because with the permanent deformation of the stop its amplitude of elastic movement is reduced. This is an advantage because with the worn lining there is less compression in the lining and it sometimes happens that the linings are worn smooth or glazed to some extent so that greater pressure is required to effect the same retarding. With the reduced clearance a greater proportion of the pedal stroke can be utilized for actual application. Also this may give to the operator some indication of the extent of the wear and a warning that a relining may be necessary. This, of course, is only one of various expedients which may be used to give warning of need for relining, but in general this will take care of itself without special expedients, especially by "squeal" from rivet heads or worn linings.

For reasons of economy and simplicity the stop member 19 will ordinarily be of square or of round section as shown in Fig. 1, but there is some advantage in using the structural sections, especially a T-section as shown in Fig. 2, or a flat strip lying in the plane of bending.

Figure 4:
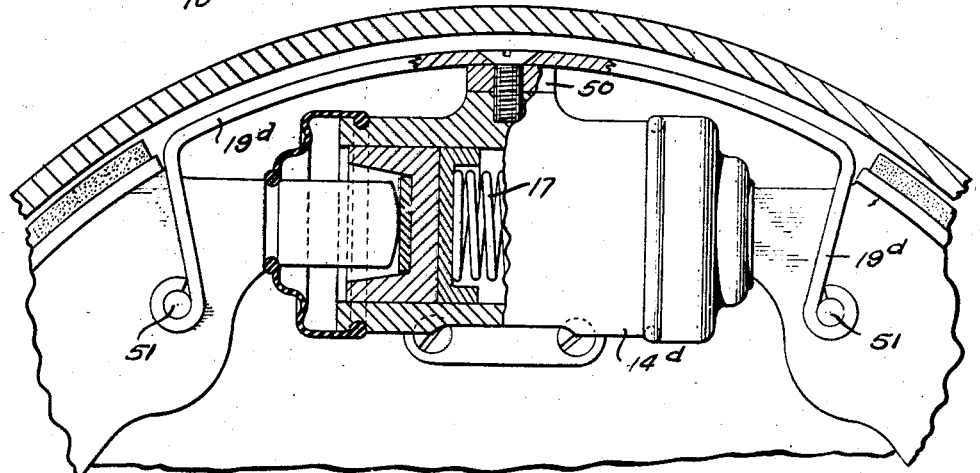
Fig. 4 is a fragmentary view similar to that of Fig. 1 showing another modification.

In Fig. 4, I have shown a construction designed to give a greater and more quickly responsive temporary thermostatic adjustment. In this case the adjusting member 19d is extended over the outside of the brake motor cylinder 14d, being secured thereto through the insulating block 50. The ends of this member 19d are secured respectively to the ends of the brake shoes by means of the pins 51. The outer surface of the member 19d is preferably roughened and blackened so that it absorbs radiant heat as well as convection heat and is thereby maintained at a temperature which very closely follows that of the drum. Even in this case, however, it is preferable to have the expansion of this member 19d limited to less than will under ordinary circumstances fully compensate for expansion of the drum. That is to say with the drum expanding under normal service conditions the clearance of the brake shoes should increase due to a slight lag on the part of this expansive member 19d. Thus with rapid cooling of the drum, if the cooling of the member 19d should lag behind, there will still be no dragging of the brake. It is an important advantage of this invention, however, that such temporary dragging could never be seriously objectionable, since the bending member would yield with light pressure and drag only enough to expand the drum once more beyond the shoes.

In the construction illustrated in Fig. 4, both retraction of the brake shoes and adjustment are secured through the flexing of the bent over ends and, to a lesser extent, of the entire arcuate strip 19d. From what has already been said above the principle and operation of this particular embodiment will be readily understood without further explanation.

Figure 5:
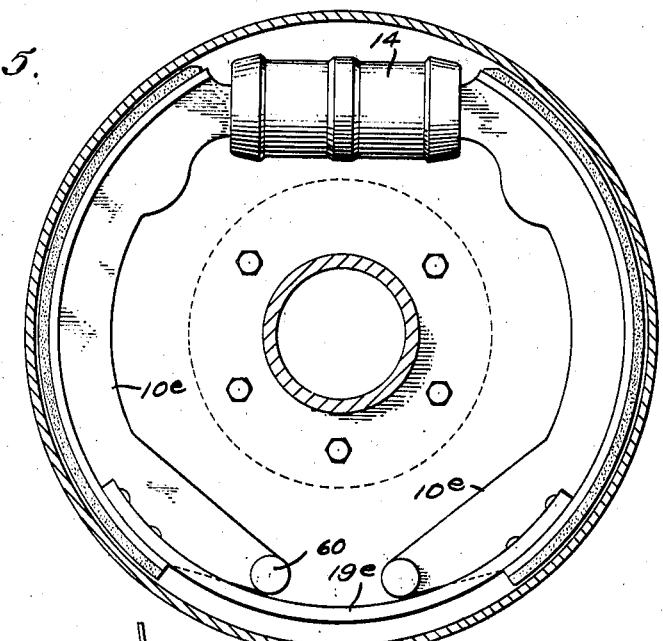
Fig. 5 is a fragmentary view showing still another embodiment of the invention.

In Fig. 5 the adjustment stop 19e serves as a connecting stop between the two shoes 10e. This can be used either with an anchor bolt 60 or in constructions where the anchor bolt is not used. In either case the elastic effect of the spring strip 19e serves to retract the shoes 10e from the drum and to press them against the brake motor 14. This strip 19e like the other stop members 19 to 19d is possessed of limited elasticity and its limit of elasticity is reached at the point of full brake operation. As the brake lining wears and the shoes are pushed beyond this position a permanent strain is given to the stop 19e and as a consequence the shoes return only the given clearance and an adjustment is thus effected in the same way as already described above for the other figures.

What has been said above regarding thermal extension and roughening and darkening of the outer surface may be applied also to this construction as illustrated by Fig. 5.

I have referred in the above description specifically to hydraulic brake systems because they are today the only systems of great importance practically. It should be understood, however, that the invention is generally applicable and not limited to the hydraulic system. In any such system, however, there should be some means to permit full return of the pedal or other force applying member to serve in place of the breather opening and reservoir if those are not provided; obviously, for example, this could be accomplished in a mechanical system by a double ratchet or by a connection in the linkage releasable at the end of the return stroke.

This application is a continuation in part of my prior application, Serial No. 81,793, filed May 26, 1936.

I claim:

1. In a braking system having a braking element, movable into braking engagement and to a clearance position, the combination therewith of a stop for determining said clearance position, said stop being anchored at one part and having another part connected to the braking element so as to be engaged therewith in both directions of movement, and a ductile portion between said parts which is capable of permanent deformation by a force available in the normal operation of the braking system, but having its elastic limit substantially coinciding with the position of full braking engagement resulting from movement through a normal clearance, whereby only upon movement of the braking element through a greater than normal clearance will the stop be permanently deformed, and thereafter the released position of the braking element will be correspondingly advanced.

2. A braking system as defined in claim 1, which further includes spring means balanced against the ductile stop whereby to determine the clearance position at a position other than the relaxed position of the ductile stop.

3. The combination as defined in claim 1 in which the elastic stop is the sole means for retracting the braking element and which further comprises a spring opposing the elastic retracting effect of the stop whereby to hold it continually under elastic tension.

4. In a braking system having a braking element movable into and away from braking engagement, the combination therewith of a stop which comprises an elongated member of ductile metal having a portion thereof extending transversely to the direction of movement of the braking element, whereby it may be readily bent by operation of the element, and having an elastic deflection from its stop position in the direction of operation of the braking element which is not substantially greater than the total effective movement of the braking element plus the effect of normal clearance between the shoe and drum.

5. A device as defined in claim 1 in which the ductile piece is adapted by longitudinal thermal expansion due to normal heating from the brake to effect a temporary adjustment of the brake approximately equivalent to but less than the increased clearance in the brake due to its thermal expansion.

6. A brake adjusting device comprising a piece of ductile metal having one end connected to a movable brake member and its opposite end anchored therebeyond in the direction of retraction of the brake member, its limit of elasticity being such that it is reached approximately at the position of said brake member corresponding to full brake application resulting from movement of the braking element through a normal clearance, and its total elastic deflection being less than equivalent to the amplitude of movement of a device connected to said brake member for effecting brake application.

7. In a brake mechanism a brake drum, a brake shoe adapted to engage the drum, an operating device to force the shoe against the drum and a retractile spring of ductile material for retracting the shoe from the drum, which spring has its limit of elasticity substantially coinciding with the position of full application of the brake shoe against the drum resulting from movement of the braking element through a normal clearance, and has a limited return in said mechanism which is within its elastic limit and less than would be equivalent to the maximum single stroke of the operating device.

GEORGE S. LANE.